US007165592B1

(12) United States Patent
Yerian et al.

(10) Patent No.: US 7,165,592 B1
(45) Date of Patent: Jan. 23, 2007

(54) STRIP MATERIAL APPLICATOR APPARATUS

(75) Inventors: Dirk Yerian, Tallmadge, OH (US); Marlin Bailor, Tallmadge, OH (US); Carter Bailey, Tallmadge, OH (US); Daniel DiMassa, Tallmadge, OH (US)

(73) Assignee: Berran Industrial Group, Inc., Kent, OH (US)

( * ) Notice: Subject to any disclaimer, the term of this patent is extended or adjusted under 35 U.S.C. 154(b) by 0 days.

(21) Appl. No.: 10/733,688

(22) Filed: Dec. 10, 2003

Related U.S. Application Data

(60) Provisional application No. 60/432,105, filed on Dec. 10, 2002.

(51) Int. Cl.
*B32B 37/00* (2006.01)
*B29C 53/82* (2006.01)
*B65H 81/00* (2006.01)

(52) U.S. Cl. ..................................... 156/391
(58) Field of Classification Search ............... 156/391, 156/425, 428, 429, 443, 445, 448–450, 456, 156/458, 459; 116/63 P; 242/443
See application file for complete search history.

(56) References Cited

U.S. PATENT DOCUMENTS 2,575,887 A  11/1951 Nitchie
3,899,383 A  8/1975 Schultz et al.
4,009,072 A * 2/1977 Schultz et al. ............. 156/584
4,083,033 A  4/1978 Kulp et al.
4,621,662 A * 11/1986 Olry ........................... 138/129
4,938,824 A * 7/1990 Youngkeit .................. 156/173
5,047,107 A * 9/1991 Keller et al. ............... 156/184
5,145,543 A * 9/1992 Redd et al. ................. 156/171
5,451,287 A * 9/1995 Marty ........................ 156/446
5,753,347 A  5/1998 Baker et al.
6,017,602 A  1/2000 Baker et al.

FOREIGN PATENT DOCUMENTS

GB  2096214 A * 10/1982
GB  2323878 A * 10/1998

* cited by examiner

Primary Examiner—Chris Fiorilla
Assistant Examiner—Chan Sing Po
(74) Attorney, Agent, or Firm—John D. Gugliotta

(57) ABSTRACT

An apparatus for application of strip material to an object comprises a base supporting and mechanically rotating a mandrel projected therefrom, wherein an object is seated onto the mandrel. The object is securely held to the mandrel by a plurality of clamps engaging and impinging the object thereto. At least one applicator assembly is urged forward to apply strip material to the object, each applicator assembly comprising a material spool for dispensing strip material and a back spool for collecting strip material backing separated from the strip material during application. After application of the strip material, an arm and scalpel sever the strip material, and the applicator assembly pivots to apply the remaining end portion of the strip material.

28 Claims, 7 Drawing Sheets

STRIP MATERIAL APPLICATOR APPARATUS

RELATED APPLICATIONS

This application claims the benefit of U.S. Provisional Application Ser. No. 60/432,105 filed on Dec. 10, 2002, the disclosure of which is hereby incorporated by reference as if fully rewritten.

BACKGROUND OF THE INVENTION

1. Field of the Invention

The present invention relates generally to a device for applying a strip of material to an object and, more particularly, to a device for applying a strip of adhesive tape or reflective sheeting to an object that is rotated on a mandrel and in communication with at least one tape or sheeting head.

2. Description of the Related Art

A number of devices have been constructed for applying bands of metal, tape, adhesive or other similar materials to polygonal bodies. At least three general embodiments representative of such devices are found in U.S. Pat. Nos. 3,899,383 and 4,009,072 (issued in the name of Schultz et al.) and U.S. Pat. No. 2,575,887 (issued in the name of Nitchie).

In the patents issued to Schultz et al., a device for applying spaced lengths of reflex-reflective strip material to a tire casing is disclosed. The device comprises an applying station defined by two strip applying heads axially aligned on the same side of the tire casing, thereby applying the material in a parallel alignment about the tire casing.

In the patent issued to Nitchie, a box blank taping machine is disclosed, in which tape is applied to the boxes along the edges so as to form a box. The taping machine comprises a tape reel arranged in a free loop configuration.

The aforementioned patents suffer from several deficiencies, the most prominent of which are noted. Included is the failure to provide a cutting mechanism that provides optimal tautness to the material for severing and forming a substantially seamless connection between the head and tails of the material. Yet another deficiency includes the failure to provide means for cleaning the cutting mechanism after consecutive cuts, thereby eliminating adhesive build-up on the cutting mechanism. Another deficiency includes the failure to provide means for automatically detecting exhaustion of the reel or spool upon which the material is wound. Another deficiency includes the failure to provide means for removing oil and/or liquid residue that remains from production of a plastic body Consequently, a need for a device which overcomes the inefficiencies and deficiencies noted above is evident, and is fulfilled by the present invention.

A search of the prior art did not disclose any patents that read directly on the claims of the instant invention; however, the following references were also considered related:

U.S. Pat. No. 4,083,033, issued in the name of Kulp et al., discloses a traffic control device in the form of a drum or barrel;

U.S. Pat. No. 5,753,347, issued in the name of Baker et al., discloses a traffic control device having double walled construction; and U.S. Pat. No. 6,017,602, issued in the name of Baker et al., discloses a traffic control device having double walled construction.

In one embodiment of the present invention disclosed herein, the present invention is described as a device for applying reflective tape or sheeting to a traffic control device, such as a drum or barrel. The manufacture and functional appearance of the drums/barrels are governed by a manual produced by the Federal Highway Administration (FHWA), and is entitled "Manual of Uniform Traffic Control Devices" (MUTCD), and is accessible at http://www.mutcd-.fhwa.dot.gov. In Part 6, § 6F.59, the MUTCD requires that horizontally circumferential bands of reflective striping are adhered to the drum or barrel in alternating orange and white stripes. The reflective stripes are required to have a dimensional width of four inches or six inches. As such, the embodiment corresponding to application of reflective sheeting to a traffic control drum or barrel is particularly advantageous in fulfilling the requirements of the MUTCD.

SUMMARY OF THE INVENTION

Briefly described according to one embodiment of the present invention, an apparatus for applying strip material to an object comprises a base having a mandrel for supporting an object, the mandrel projecting from the base, a plurality of clamps selectively movable for engaging and maintaining the position of the object, the plurality of clamps affixed to the base, and at least one strip material applicator assembly selectively movable for engaging and applying strip material onto the object as the base rotates. The base rotates via a motor integrally coupled thereto.

It is a feature of the present invention to provide an apparatus having a base comprising a plurality of openings formed in the area on which the mandrel rests. The openings operate in conjunction with a plurality of openings formed in the mandrel (at the opposite end) so as to prevent creation of vacuum pressure and lock on the object when placed on the mandrel.

It is another feature of the present invention to provide an apparatus having a mandrel outwardly projecting from and substantially perpendicular to the base. The mandrel is envisioned as having a variety of lengths and diameters to provide versatility in accommodating variously dimensioned objects. It is envisioned that the mandrel is dimensioned so as to compliment the internal area of an object, such as a drum, a barrel, a stepped cone or other similar devices of varying lengths and widths. However, it should be noted that the object can have only a slight draft angle for moldability, because if the draft angle is too great on the object, the strip material will not track properly and wrinkles and air pockets will form. It is further envisioned that the mandrel is tapered from a fixed end to a free end (widest width at fixed end and narrowest width at free end). The tapering may be configured to have a uniformly gradual taper, such as similar to a cone. The tapering may also be configured to have a stepped taper, wherein at specified lengths of the mandrel, the exterior circumference is offset toward a center or central axis of the base and mandrel, so that a series of steps are formed (from a widest width at fixed end to a narrow width at free end). It is further envisioned that the mandrel comprises a plurality of openings formed at the free end substantially perpendicular to the central axis. As indicated previously, the openings operate cooperatively with openings to prevent formation of vacuum pressure on object during application of strip material.

It is another feature of the present invention to provide an apparatus having a plurality of clamps affixed to the base, the clamps provided to selective move between an engaged and disengaged (resting) position. When actuated, the clamps engage and impinge against the object seated on the mandrel. The clamps are controlled by an air cylinder.

It is another feature of the present invention to provide an apparatus having at least one strip material applicator assembly, wherein each assembly comprises a panel upon which a pair of spools, at least one roller guide, a pair of vacuum blocks, an arm and guide wheels are affixed. The panel is urged forward and backward along a track via a limited pressure air cylinder. The pair of spools dispense or release the strip material. The at least one roller guide is provided for aligning the strip material onto the object. The pair of vacuum blocks cooperatively operate to begin and end application of the strip material. The arm includes a scalpel affixed at a free end thereof, the arm severing the strip material. The guide wheels engage the object for maintaining proper spatial relationship between the assembly and the object.

It is another feature of the present invention to provide an apparatus further comprising a direct plasma flame treatment member, wherein the direct plasma flame treatment member generates a flame for evaporating liquid residue left from fabrication of the object. Furthermore, the direct plasma flame treatment of the object warms the object to activate any adhesive provided on the strip material, thereby optimizing the adhesion between the strip material and the object.

It is another feature of the present invention to provide an apparatus further comprising a brush head, wherein the brush head is used to firmly press the applied strip material against the object, thereby removing any air pockets that may have formed during application, and further optimizing adhesion between the strip material and the object.

It is another feature of the present invention to provide an apparatus further comprising a visual detector/curtain, in conjunction with full perimeter guarding where access is not required, wherein a pair of detectors are affixed at a front of the apparatus, wherein unauthorized penetration of an item (such as an operator's arm, leg, a tool or other flying debris) breaks a beam between the detectors and automatically terminates the application cycle. This automatic termination prevents injury to an operator, damage to tools, damage to the apparatus, and ensures the safe operation of the apparatus, in general.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4a is perspective view of the front of a vacuum block;

FIG. 4b is a perspective view of the rear of the vacuum block;

DESCRIPTION OF THE PREFERRED EMBODIMENTS

The best mode for carrying out the invention is presented in terms of its preferred embodiment, herein depicted within FIGS. 1 through 6.

1. Detailed Description of the Figures

Figure 1:
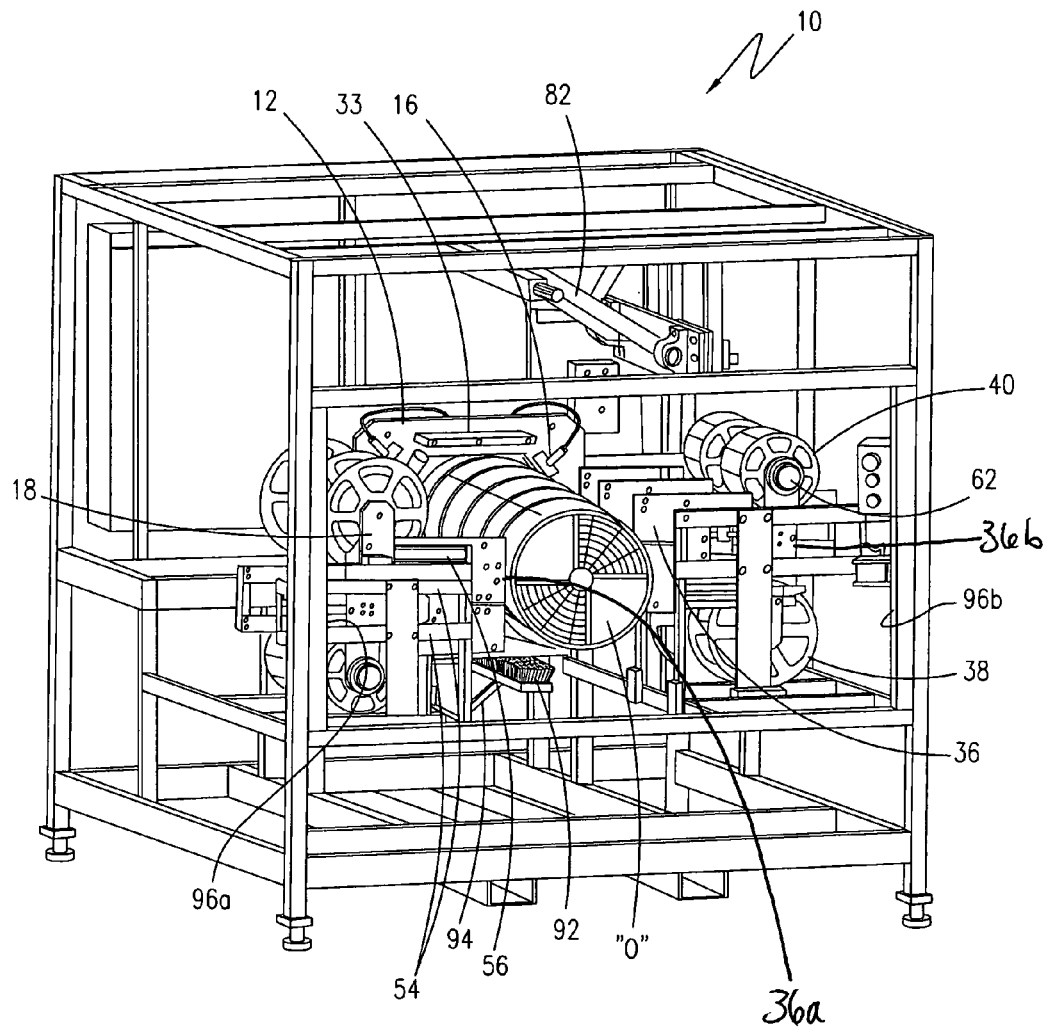
FIG. 1 is a perspective view of an apparatus for applying strip material to an object depicted as supported and enclosed by a frame.

Referring to FIG. 1, an apparatus for applying strip material to an object 10 (hereinafter "apparatus") is shown in accordance with a preferred embodiment of the present invention. The apparatus 10 comprises a base 12 having a mandrel 14 for supporting the object "O", the mandrel 14 projecting from the base 12, a plurality of clamps 16 selectively movable for engaging and maintaining the position of the object "O", the plurality of clamps 16 affixed to the base 12, and at least one strip material applicator assembly 18 selectively movable for engaging and applying strip material "S" onto the object "O" as the base 12 rotates. The base 12 rotates via a motor 20 integrally coupled thereto.

Figure 2:
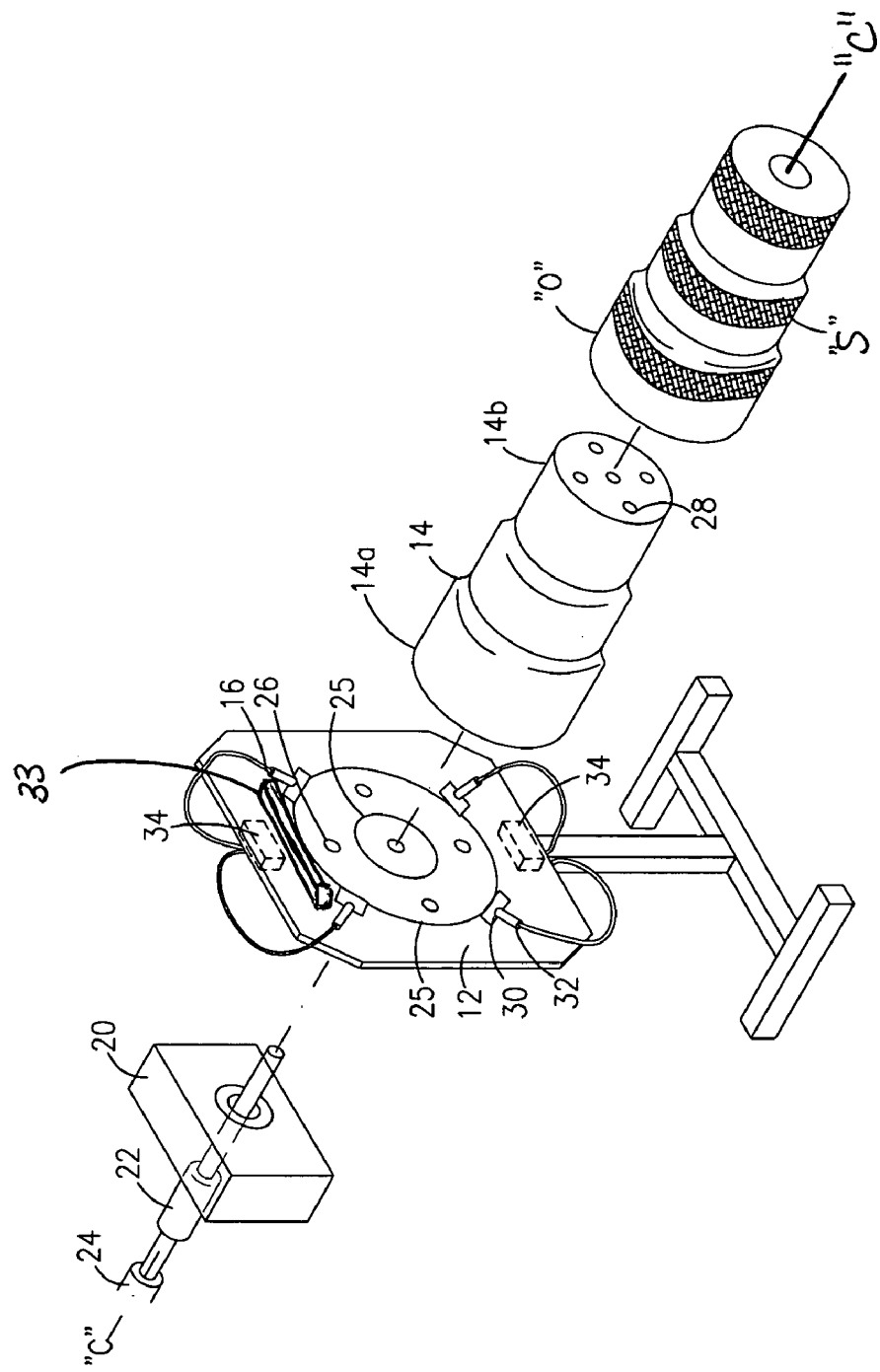
FIG. 2 is an exploded perspective view of a motor, base, mandrel and object of the apparatus of FIG. 1.

Referring now to FIG. 2, the motor 20 is a standard motor package commonly known in the art, and includes a rotary union 22 and an encoder 24 coupled therein, the encoder 24 providing precise control of direct flame plasma treatment, strip material application and brushing sequence further described below. A worm gear reducer and DC motor rotates the mandrel 14, although other variations of the components integral to the motor 20 are envisioned, including common substitutions known to one of ordinary skill in the art.

The base 12 is substantially planar and may have a variety of geometric configurations, including a circular or disc form, square, rectangular or other polygonal form. So long as the base 12 is of sufficient size to accommodate the mandrel 14 and the clamps 16, and does not interfere with rotation of the base 12, the size and form are variable. The base 12 is envisioned as comprising a plurality of openings 26 formed in the area on which the mandrel 14 rests. The openings 26 operate in conjunction with a plurality of openings 28 formed in the mandrel 14 (at the opposite end) so as to prevent creation of vacuum pressure and lock on the object "O" when placed on the mandrel 14.

The mandrel 14 outwardly projects from and is substantially perpendicular to the base 12. The mandrel 14 may be fabricated from a variety of materials, including metal or plastic, so long as the material is durable and rigid to fully withstand and support repeated placement and removal of an object "O" thereon. The mandrel 14 is envisioned as having a variety of lengths and diameters to provide versatility in accommodating variously dimensioned objects "O". It is envisioned that the mandrel 14 is dimensioned so as to compliment the internal area of an object "O", such as a drum, a barrel, a stepped cone or other similar devices of varying lengths and widths (and is further detailed below).

However, it should be noted that the object "O" can have only a slight draft angle for moldability, because if the draft angle is too great on the object, the strip material will not track properly and wrinkles and air pockets will form. It is further envisioned that the mandrel 14 is tapered from a fixed end 14a to a free end 14b (widest width at fixed end 14a and narrowest width at free end 14b). The tapering may be configured to have a uniformly gradual taper, such as similar to a cone. The tapering may also be configured to have a stepped taper, wherein at specified lengths of the mandrel 14, the exterior circumference is offset toward a center or central axis "C" of the base 12 and mandrel 14, so that a series of steps are formed (from a widest width at fixed end 14a to a narrow width at free end 14b). It is further envisioned that the mandrel 14 comprises a plurality of openings 28 formed at the free end 14b substantially perpendicular to the central axis "C". As indicated previously, the openings 28 operate cooperatively with openings 26 to prevent formation of vacuum pressure on object "O" during application of strip material "S".

The plurality of clamps 16 are affixed to the base 12 and comprise a leg 30 and a foot 32, although other configurations are envisioned as permissible substitutions thereof and functioning in a similar manner, the leg 30 and foot 32 coupled to an air cylinder 34 for providing engagement and disengagement of object "O". When the clamps 16 and air cylinder 34 are actuated for operation, the air cylinder 34 urges the clamps 16 into engagement with the object "O", wherein the foot 32 directly contacts and engages a portion of the exterior of the object "O". The foot 32 may comprise a linear or curvilinear configuration, provided that the foot 32 (and the clamp 16 collectively) functions properly in securely impinging the object "O" in place during application of strip material "S". It is envisioned that at least two clamps 16 are required for securing the object "O", and in such a configuration, the clamps 16 are positioned approximately 180° apart. It is further envisioned that four clamps 16 are capable of supplying greater security and impingement upon the object "O", and in such a configuration, the clamps 16 are positioned approximately 90° apart. A locking block 33 engages a detail on the object "O" so that the object "O" remains fixed relative to an installed position, thereby preventing object "O" from spinning on the mandrel 14, since application of strip material "S" generates considerable drag on the object "O" because of tension adjustment necessary to maintain tautness to the strip material "S", which can cause the object "O" to shift. After the object "O", base 12 and mandrel 14, collectively, complete the application cycle (as described below), the air cylinder 34 releases the pressure that urged the clamps 16 onto the object "O", thereby permitting retraction of the clamps 16 from the object "O" into a starting or home position and ready for a subsequent application cycle.

Figure 3A:
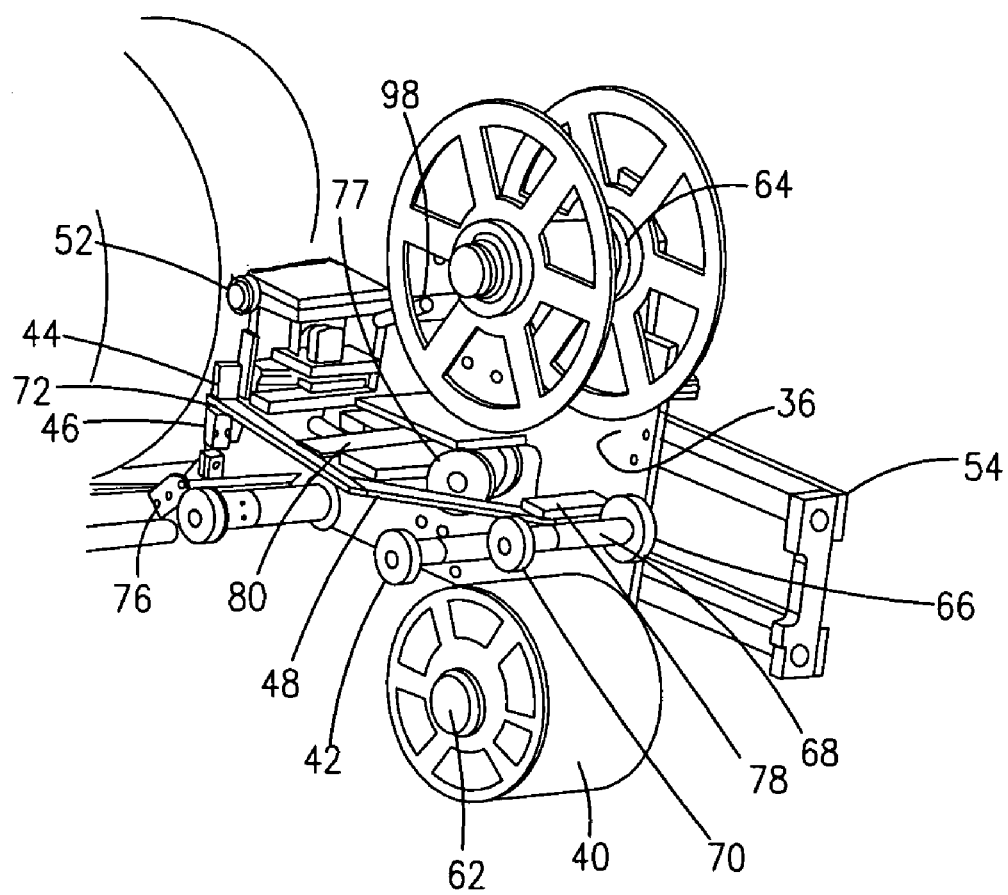
FIG. 3a is perspective view of an applicator assembly engaging an object.
Figure 3B:
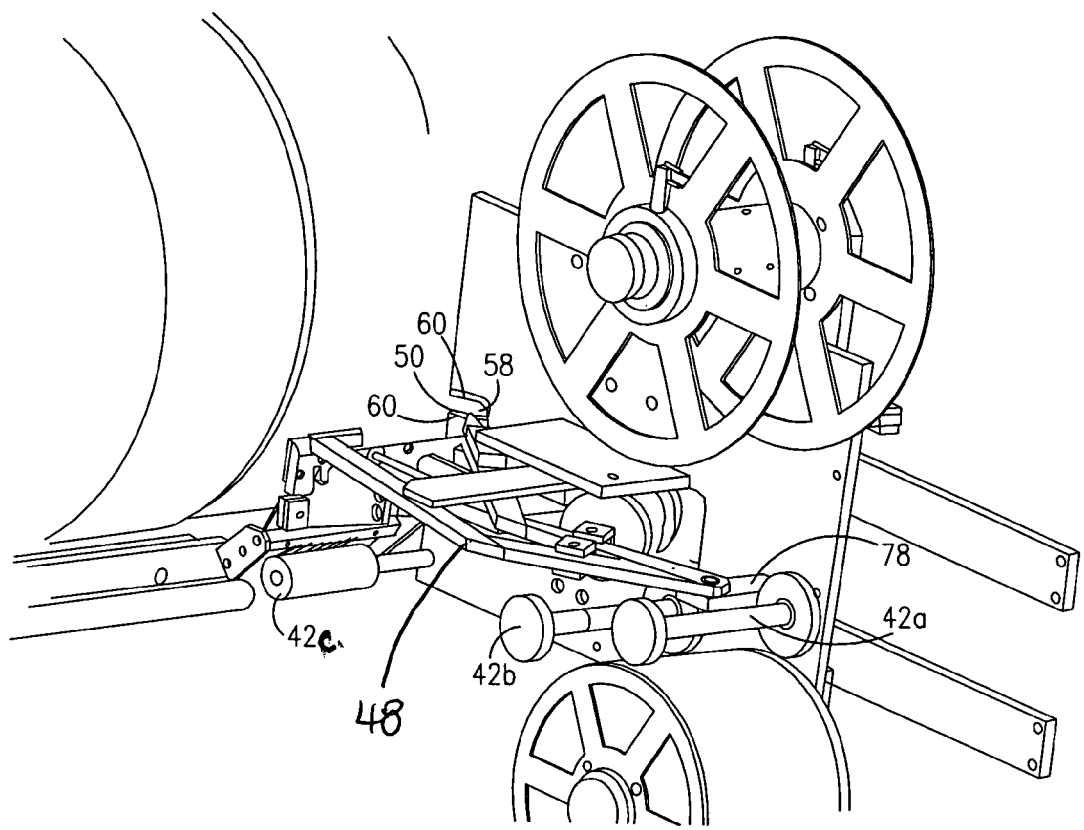
FIG. 3b is an enlarged perspective view of FIG. 3a, wherein an upper vacuum block and wheels are removed to clearly illustrate the arm, the scalpel at the end of the arm, and the slot in which the scalpel resides, the slot having felt wicks saturated with solvent for cleaning the scalpel after use.
Figure 4C:
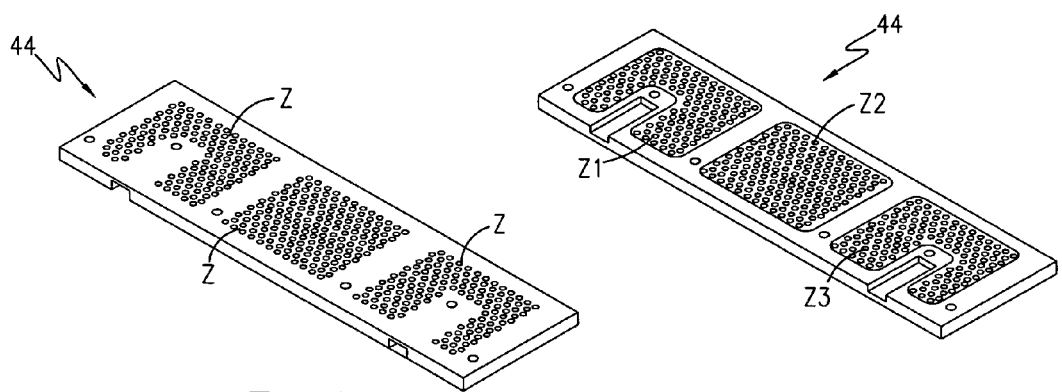
FIG. 4c is a top view of the front of the vacuum block.
Figure 4C:
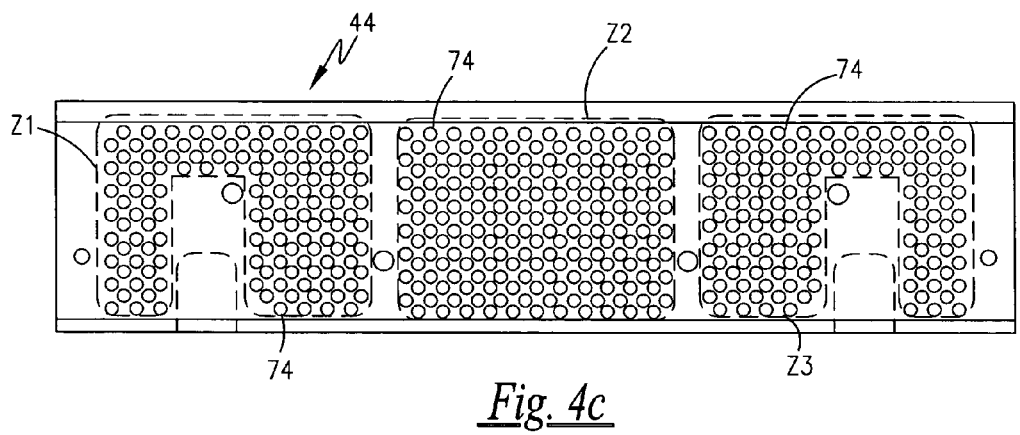

Referring now to FIG. 3a and FIG. 3b, the strip material applicator assembly 18 is a unit comprising a panel 36 upon which a pair of spools 38 and 40, at least one roller guide 42, a pair of vacuum blocks 44 and 46, an arm 48 and guide wheels 52 are affixed. The panel 36 is urged forward and backward along a track 54 via a limited pressure air cylinder 56 (wherein the track 54 may have a single, double or triple rail configuration, a double rail version is depicted in the figures). The panel 36 comprises a slot 58 having felt wicks 60 saturated with cleaning solvent placed therein, the slot 58 receiving the arm 48 and cleansing a scalpel 50 (further described below) so as to remove accumulated debris and prepare the arm 48 and scalpel 50 for subsequent use. The pair of spools 38 and 40 releases the strip material "S" for application to the object "O". The pair of spools 38 and 40 comprises a strip material spool and a backing material spool, and for purposes of illustration only of the figures depicted, the strip material spool is designated 38 and the backing material spool is designated 40. The strip material spool 38 comprises a removable and replaceable roll of strip material "S" for dispensing. The strip material spool 38 comprises or works in conjunction with a photo-detector 60 that automatically terminates application of the strip material "S" upon failure to detect the strip material "S" on the strip material spool 38. The automatic termination of the application sequence or cycle permits an operator to quickly and efficiently remove the exhausted strip material paper core from strip material spool 38 and replace with a quantity of strip material "S" for further application. The backing material spool 40 collects the backing material "S" separated from the strip material "S" during application onto the object "O". The backing material spool 40 is driven by an air motor 62 positioned behind the backing material spool 40, the air motor 62 allowing for adjustment to pulling tension and speed of collecting the backing material "S".

Each of one of the pair of spools 38 and 40 comprise a laterally adjustable flange 64 to accommodate strip material "S" of varying widths. The adjustable flange 64 operates in conjunction with a locking disc, a pin removably insertable into the disc for lateral adjustment to the spool (with corresponding holes to accommodate lateral adjustment), and an axle coaxial to the mount on which a paper core of strip material "S" resides against. The axle has a flat surface upon which a biased O-ring secures a lock rod against. The lock rod prevents the paper core from slipping on the axle and not maintaining the proper drag required keeping the tape tight, thereby distorting the precision of applying the strip material "S". A wing nut knob coupled to a biased internal spring and friction disc is distal to the axle and locking disc, thereby permitting tension adjustment on the spool. First, the flange is removed, and then the locking pin is moved to the center of the flat surface on the axle to release any hold it has on the core, thereby allowing it to be removed and new strip material "S" installed.

At least one roller guide 42 for aligning the strip material "S" onto the object "O" is provided. It is envisioned that a plurality of roller guides (denoted as 42a, 42b and 42c, respectively) are included to provide optimal alignment and precision in applying strip material "S" to object "O". Each one of the roller guides 42a, 42b and 42c comprise a collar 66 affixed to the panel 36 with a linearly elongated shaft 68 projecting therefrom, the strip material "S" following the path of the shaft 68. A second collar 70 is affixed at an opposite end of the shaft 68, the collars 66 and 70 cooperatively functioning to guide the strip material "S" therein and preventing the strip material "S" from deviating from that desired path or course. It is envisioned that the collar 70 is secured to the shaft 68 via a wing nut or knob so that the collar 70 may be removed and either replaced with a more narrow or wider collar 70 so that accommodation for various widths of strip material "S" is provided. It is also envisioned that the collar 70, after removal, may be reversed so that the former distal portion of the collar 70 is more proximally placed, thereby reducing the width of the path along shaft 68, thus accommodating narrow widths of strip material "S". The width of the path of shaft 68 is envisioned as adjustable between one-half (0.5) and six (6) inches, the standard width dimensions of most strip material "S" available. The adjustment of the roller guides 42 corresponds to the need or desire to manage and set the desired placement of strip material "S" at one segment of the object "O" (such as the stepped drum or barrel depicted in FIG. 2), wherein the placement of strip material "S" may be offset from either edge a specified distance, or may be aligned so that a center axis of the strip material "S" aligns with the center axis of a segment of the object "O", for example.

Referring specifically to FIG. 3a, FIG. 3b, and FIG. 4a through FIG. 4c, the pair of vacuum blocks 44 and 46 cooperatively operates to begin and end application of the strip material "S". The pair of vacuum blocks may be further defined as an upper vacuum block 44 and a lower vacuum block 46, wherein a margin 72 separates the upper vacuum block 44 from the lower vacuum block 46. Each of said pair of vacuum blocks 44 and 46 has a plurality of apertures 74 in communication with a vacuum generator and an air cylinder 76 to accurately position the strip material "S" onto the object "O". The apertures 74 provided are envisioned as having a diameter sufficiently small to promote vacuum suction on the strip material "S" during the application cycle, and to prevent impartation of circular indentations onto the strip material "S". By providing small diameter apertures 74, the force exerted onto the strip material "S" by the vacuum and aperture 74 combination is dispersed about the surface area of the strip material "S", thereby reducing the probability of indentations imparted thereon. On each vacuum block 44 and 46, the apertures 74 are segregated into zones "S" and coupled to a circuit for activating or deactivating particular zones "Z" according to the width of the strip material "S". For instance, the vacuum blocks 44 and 46 are envisioned as having a width slightly greater than six (6) inches, wherein the apertures 74 are arrayed within a six (6) inch width boundary. Because of the zones "Z", one zone "Z" may be deactivated (such as a distal zone) to accommodate a lesser width of strip material "S", thereby preventing non restricted vacuum airflow in the location where the narrower material does not cover, preventing suction or vacuum from building due to the leakage, and otherwise allowing the material to fall freely from the blocks. Three segregated zones are depicted $Z_1$, $Z_2$ and $Z_3$, respectively. The upper vacuum block 46 secures the concluding end of the strip material "S" dispensed for application onto the object "O" maintaining the end so that arm 48 and scalpel 50 may swing through margin 72 and sever the strip material "S". The upper vacuum block 44 pivots or is urged toward the object "O" to apply the end of the strip material "S" secured by the block 44. The block 44 follows the form of the object "O", by pivoting, in applying the remaining strip material "S" to the object "O". At this point in the cycle, the vacuum to the upper vacuum block 44 is terminated so as to prevent open-air flow and loss of vacuum pressure to the lower vacuum block 46. It will not be turned on again until the next quantity of strip material "S" has been applied and is in place to cover the apertures 74. The lower vacuum block 46 secures a new beginning end of the strip material "S" after severing of the strip material "S" by the arm 48 and scalpel 50. The block 46 is urged toward the next object "O" to apply the beginning end of strip material "S" to object "O" secured by block 46. The block 46 follows the form of the object "O" in applying the remaining strip material "S" to the object "O". A pivotal retention brace 76 is affixed to the lower vacuum block 46 for placing tension on the strip material "S", thereby preventing the strip material "S" from slipping off of the lower vacuum block 46 during the application process when the strip material "S" is being urged forward to the product prior to being applied.

The arm 48 includes a scalpel 50 affixed at a free end thereof, the arm 48 severing the strip material "S" by swinging through the margin 72 separating blocks 44 and 46. The arm 48 rotates by expansion and contraction of an air cylinder 78 communicating with the arm 48. The arm 48 is biased to nest or return to the slot 58 for cleansing of the scalpel 50 (biasing may be accomplished by spring bias attachment or mechanical setting of pivot pin, bolt, etc.). The arm 48 comprises an elongated member having a bent elbow, wherein a fixed end of the arm 48 is attached to a support 78 by a pivot pin, bolt, screw and nut, or other similar mechanism. A fence 80 is provided either superior to or inferior to the arm 48 (depending upon the configuration of the assembly 18), the fence 80 functioning as a guide to the arm 48 and preventing upward or downward tilt of the arm 48 due to gravitational forces or mechanical imperfections in the attachment of arm 48 to support 78.

The guide wheels 52 engage the object "O" for maintaining proper spatial relationship between the assembly 18 and object "O". The guide wheels 52 are arranged superior to the blocks 44 and 46, and rotate about the object "O" while the object "O" rotates during operation.

It is envisioned that a plurality of assemblies 18 may be provided, including a combination of two assemblies 18 together positioned to one side of a central axis "C" of the base 12 and/or mandrel 14. Another envisioned combination includes a pair of assemblies 18 to one side of the central axis "C" and a second pair of assemblies 18 on the opposite side of the central axis "C". In the latter configuration (two pairs of assemblies 18 on opposing sides), one pair of assemblies 18 will be configured in reverse of the opposing assemblies 18 because the rotation of the base 12, mandrel 14 and object "O" is fixed, and optimum time efficiency is achieved by all four assemblies 18 applying strip material "S" concurrently. Therefore, one pair of assemblies 18 will be reversed and apply strip material "S" simultaneously and opposite to the opposing pair of assemblies 18. However, it is envisioned that application of strip material "S" may be alternated from one side to the other, wherein one side of assemblies 18 applies strip material "S", and then the rotation of object "O" is reverse and the other side of assemblies 18 applies strip material "S". Such a configuration would avert the need to reverse the assemblies 18 on one side, but may increase the time required for application of strip material "S". Also, if the spacing between the strip material "S" is great enough, the need to alternate sides is no longer required. The assembly 18 is intended to apply a quantity of strip material "S" sufficient to circumscribe the circumference of the object "O", thereby applying quantity equal to one revolution about the object "O".

In accordance with the figures provided, the assembly 18 of FIG. 3a and FIG. 3b depicts an arrangement wherein a forward portion 36a of panel 36 is proximal to the plane in which the mandrel 14 and object "O" rotate. The slot 58 is formed in the forward portion 36a thereof. The spools 38 and 40 are affixed at a rearward portion 36b, wherein the spools 38 and 40 are substantially aligned along a vertical plane. The roller guides 42a, 42b and 42c are arranged near a lower portion 36c of panel 36, wherein 42a is positioned adjacent the rearward portion 36b, 42c is position adjacent the forward portion 36a, and 42b is positioned therebetween. In relation, the profiles of 42a and 42b are higher in profile than 42c, as 42c approaches the blocks 44 and 46 and retention brace 76. The blocks 44 and 46 are positioned higher in profile than 42c and at the forward portion 36a. The block 44 is superior to block 46, with a margin 72 therebetween to accommodate the arm 48 and scalpel 50. The arm 48 is affixed to support 78 toward the rearward portion 36b, with the fence 80 positioned near the forward point of arm 48. This description of the assembly 18 depicted is an aid for understanding the spatial relationship of the components comprising the assembly 18, but should not be viewed as a limitation of the scope and spirit of the invention.

Figure 5:
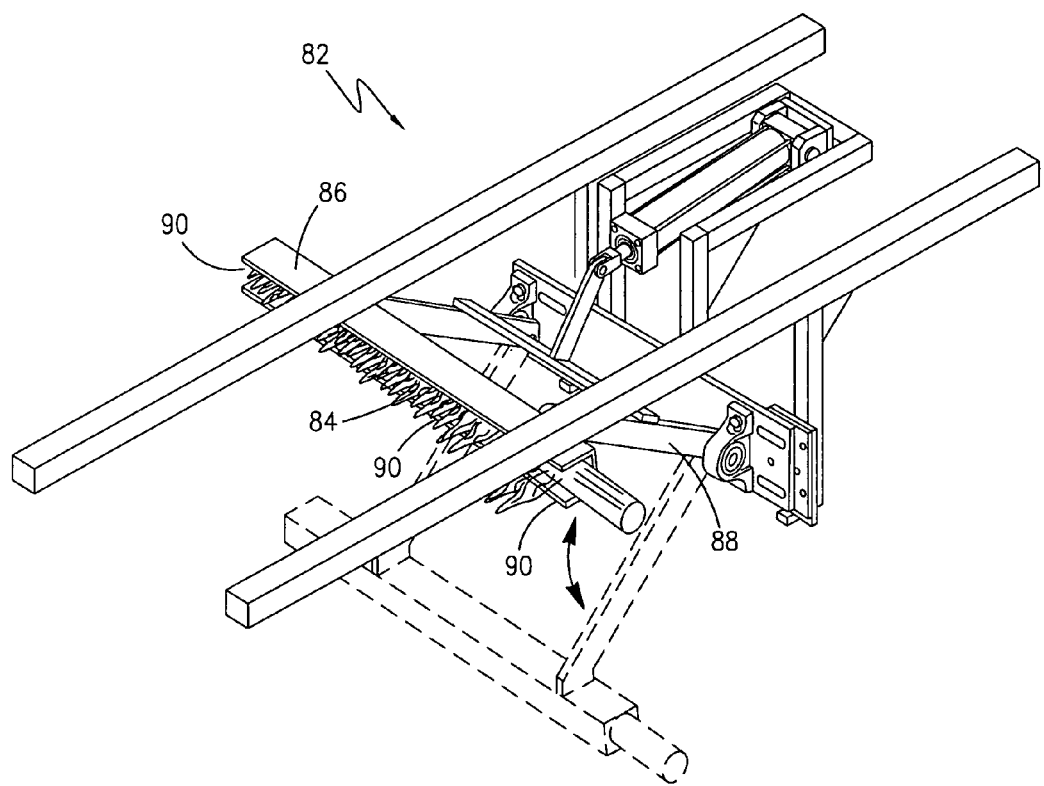
FIG. 5 is a perspective view of a flame member that is raised and lowered, and when lowered (shown in phantom lines) engages an object to evaporate any liquid and/or residue that might remain.

Referring now to FIG. 5, the apparatus 10 may further comprise a direct plasma flame treatment member 82. The direct plasma flame treatment member 82 is positioned above the base 12 and mandrel 14 and is selectively movable adjacent the object "O". The direct plasma flame treatment member 82 generates a flame 84 for evaporating residue from an exterior of the object "O", such as oil and/or water residue remaining from the fabrication of the object "O". Furthermore, the flaming of the object "O" heats up the surface and aids in activation of the glue and/or adhesive on the strip material "S", thereby providing optimal adhesion between the strip material "S" and the object "O". The direct plasma flame treatment member 82 produces a gaseous hydrocarbon fuel that reacts with the surface of the substrate (such as polymers, aluminum or glass, for example) of object "O", while avoiding the production of ozone and other harmful by-products and also avoiding the use of high voltage. It should be noted that flaming after application will damage the quality of the strip material beyond the point of usefulness. The direct plasma flame treatment member 82 comprises a pipe 86 operatively coupled with an air and gas mixture, the air and gas mixture provided to allow for adjustment in the intensity of the flame 84 as desired or required. The pipe 86 is coupled with a pivotal flame member arm 88 that raises and lowers the direct plasma flame treatment member 82 (and more particularly pipe 86) into the proper engaged or disengaged positions. It is envisioned that the pipe 86 length may be reduced to focus the flaming onto the surface area to which the strip material "S" is specifically applied to object "O". When actuated during the operation sequence, the pivotal flame member arm 88 moves from a raised (and disengaged) position to a lower (and engaged) position, the pipe 86 adjacent to the exterior circumference or perimeter of object "O". The flame 84 is actuated to engage the exterior circumference or surface of object "O" for approximately one revolution of object "O". Thereafter, the sequence deactivates the direct plasma flame treatment member 82, wherein the flame arm member 88 retracts and returns to the home or starting position away from the object "O", thereby retracting the flame 84 within pipe 86. The pipe 86 is configured so that a channel 90 is formed facing the object "O" along the entire length thereof, thus providing coverage for the entire length of object "O".

Figure 6:
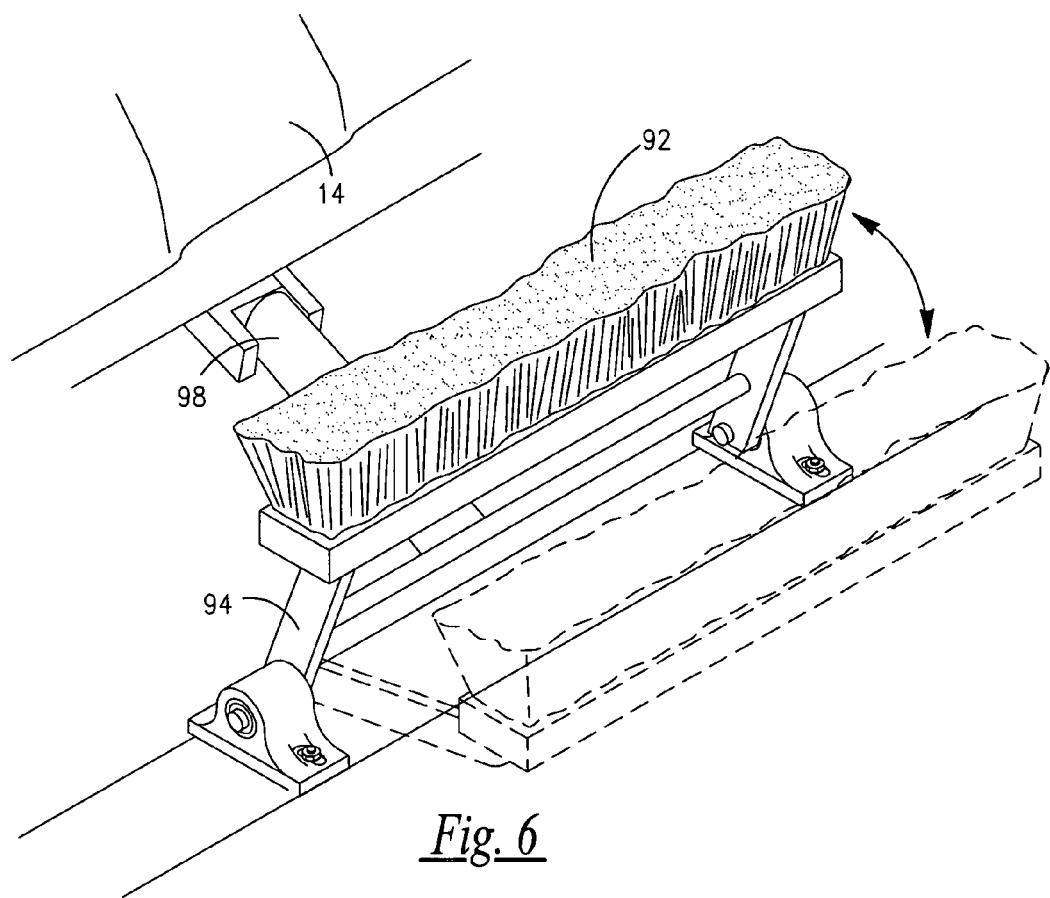
FIG. 6 is a perspective view of a brush head that is raised and lowered (shown in phantom), and when raised engages an object to firmly press against the applied strip material, thereby removing any air pockets and aiding in adhesion between the strip material and the surface of the object.

Referring now to FIG. 6, the apparatus 10 may further comprise a brush head 92. The brush head 92 is positioned below the base 12 and mandrel 14 and is selectively movable adjacent the object "O". The brush head 92 engages the strip material "S" applied to the object "O", the brush head 92 removing air pockets from the object "O". Brushing of the strip material "S" by the brush head 92 on the applied strip material "S" firmly presses the strip material "S" against the heated object "O" providing increased adhesion between the strip material "S" and object "O". Manufactures of various types of strip material "S" recommend firm pressing of the strip material "S" immediately after application (as embodied by the brushing from brush head 92) to ensure firm adhesion therebetween. The brush head 92 comprises a bristled structure coupled to a pivotal brush head arm 94 that raises and lowers the brush head 92 into the proper engaged or disengaged positions. The brush head 92 length may be reduced to focus the brushing onto the surface area to which the strip material "S" is specifically applied to object "O". When actuated during the operation sequence, the pivotal brush head arm 94 moves from a lowered (and disengaged) position to a raised (and engaged) position, the brush head 92 adjacent to the exterior circumference or perimeter of object "O". The brush head 92 is actuated to engage the exterior circumference or surface of object "O" for approximately one revolution of object "O". Thereafter, the sequence deactivates the brush head 92, wherein the brush head arm 94 retracts and returns to the home or starting position away from the object "O". The brush head 92 is dimensioned so as to provide coverage along the entire length of object "O".

As depicted in FIG. 1, the apparatus 10 may further comprise a visual detector/curtain 96, in conjunction with full perimeter guarding where access is not required, wherein a pair of detectors 96a and 96b are affixed at a front of the apparatus 10, wherein unauthorized penetration of an item (such as an operator's arm, leg, a tool or other flying debris) breaks a beam between the detectors 96a and 96b and automatically terminates the application cycle. This automatic termination prevents injury to an operator, damage to tools, damage to the apparatus 10, and ensures the safe operation of the apparatus 10 in general.

Object "O" is envisioned as encompassing a variety of shapes, forms and dimensions. Among the objects envisioned are drums, barrels, cones (providing they have steps to reduce the draft at the strip material location), cylinders and other similarly shaped vessels, and also includes non-cylindrical items, such as polygonal bodies. Of particular interest, although not a limitation to the scope and spirit of the invention, are traffic control devices, including highway drums and sand-filled safety barrels.

Strip material "S" is envisioned as encompassing reflective tape, packaging tape, deformable metal material (for application on a wooden barrel or keg, for instance), deformable rubber material, or other similarly envisioned and interchangeable items.

The apparatus 10 is depicted in FIG. 1 as supported by and enclosed within a frame. However, the apparatus 10 is capable of installation and operation outside the confines of the frame depicted. For instance, the base 12 and the components thereof are envisioned as freely standing alone, the applicator assembly(ies) 18 are envisioned as free standing, and the flame member 82 and brush head 92 are envisioned as mountable above and below, respectively. Other combinations are further envisioned without departing from the scope and spirit of the invention.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The apparatus 10 is intended to apply strip material "S" to an object "O" in a manner in agreement with the description of the apparatus 10 described above. The aforementioned methods of applying strip material "S" may be categorized as having an initial sequence, an intermediate sequence, and a terminal sequence.

The initial sequence includes seating of the object "O" onto the mandrel 14, actuating engagement of the plurality of clamps 16 onto the object "O" and actuating rotation of the mandrel 14. The initial sequence may further comprise the steps of moving the direct flame plasma treatment member 82 adjacent to object "O", flaming an exterior surface of object "O" to evaporate liquid residue, and moving the direct flame plasma treatment member 82 away from object "O".

The intermediate sequence includes urging of at least one strip material applicator assembly 18 forward to engage and apply strip material "S" to object "O" and then severing the strip material "S" after object "O" completes one revolution about the base 12. The intermediate sequence may further comprise moving a brush head 92 to engage the strip material "S" as applied to object "O", dispersing of air pockets and aiding adhesion between the strip material "S" and object "O" by engagement of the brush head 92 with object "O", and moving the brush head 92 away from object "O".

The terminal sequence includes terminating rotation of the mandrel 14 and seated object "O", releasing engagement of the plurality of clamps 16 from object "O", and removing object "O" from the mandrel 14.

A first envisioned method for applying strip material "S" to an object "O" comprises the steps of:
(a) securing or seating an object "O" to the rotating mandrel 14;
(b) actuating engagement of a plurality of clamps 16 onto object "O";
(c) rotating the mandrel 14 and object "O";
(d) urging at least one strip material applicator assembly 18 forward to engage and apply strip material "S" to object "O";
(e) severing the strip material "S" after object "O" completes one revolution;
(f) terminating rotation of the mandrel 14 and object "O";
(g) releasing engagement of the plurality of clamps 16 from object "O"; and
(h) removing object "O" from the mandrel 14.

A second envisioned method for applying strip material "S" to an object "O" comprises the steps of:
(a) securing or seating an object "O" to the rotating mandrel 14;
(b) actuating engagement of a plurality of clamps 16 onto object "O";
(c) rotating the mandrel 14 and object "O";
(d) moving the direct flame plasma treatment member 82 adjacent to object "O";
(e) flaming an exterior surface of object "O" to evaporate liquid residue;
(f) moving the direct flame plasma treatment member 82 away from object "O";
(g) urging at least one strip material applicator assembly 18 forward to engage and apply strip material "S" to object "O";
(h) severing said strip material after object "O" completes one revolution;
(i) moving a brush head 92 to engage the strip material "S" as applied to object "O";
(j) dispersing air pockets and aiding adhesion between the strip material "S" and object "O" by engagement of the brush head 92 with object "O";
(k) moving the brush head 92 away from object "O";
(l) terminating rotation of the mandrel 14 and object "O";
(m) releasing engagement of the plurality of clamps 16 from object "O"; and
(n) removing object "O" from the mandrel 14.

Other envisioned methods are contemplated, including the removal of steps (d) through (f) in the second envisioned method above (constituting a fourth method), and also including the removal of steps (i) through (k) in the second envisioned method (constituting a fourth method).

As depicted in the figures, the object "O" is specifically shown as a traffic control device, such as a drum or barrel manufactured to the governmental standards set forth in the MUTCD (noted in the background portion). "S" is strip material, depicted as reflective sheeting or tape applied to traffic control devices in accordance to the standards set forth in the MUTCD. It should be noted that the use of traffic control devices and corresponding reflective material in this application is for purposes of illustration, and should be interpreted as a limitation on the scope of the claims disclosed below.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An apparatus for applying strip material to an object, said apparatus comprising:
a base having a mandrel for supporting said object, said mandrel projecting from said base, wherein said base rotates via a motor and wherein said mandrel comprises a plurality of openings in a free end thereof to prevent vacuum suction on said object;
a plurality of clamps selectively movable for engaging and maintaining the position of said object, said plurality of clamps affixed to said base; and
at least one strip material applicator assembly selectively movable for engaging and applying strip material onto said object as said base rotates.

2. The apparatus of claim 1, wherein said motor comprises a rotary union coupled with an encoder, said encoder allowing precise control of operational sequence.

3. The apparatus of claim 1, wherein said mandrel comprises a tapered circumference.

4. The apparatus of claim 3, wherein said circumference is tapered from a fixed end toward a free end.

5. The apparatus of claim 3, wherein said circumference is tapered in a stepped configuration from a fixed end toward a free end.

6. The apparatus of claim 1, wherein said mandrel is defined by a length and diameter substantially complimentary to said object.

7. The apparatus of claim 1, wherein each one of said plurality of clamps comprises a leg and a foot affixed thereto, said clamp selectively movable by an air cylinder.

8. The apparatus of claim 1, wherein said plurality of clamps are configured 90° apart about a circumference of said object.

9. The apparatus of claim 1, wherein said at least one strip material applicator assembly comprises:
a panel upon which a pair of spools, at least one roller guide, a pair of vacuum blocks, an arm and guide wheels are affixed, said panel urged forward and backward along a track via a limited pressure air cylinder;
said pair of spools for releasing said strip material;

said at least one roller guide for aligning said strip material onto said object;

said pair of vacuum blocks cooperatively operating to begin and end application of said strip material;

said arm having a scalpel affixed at a free end thereof, said arm severing said strip material;

said guide wheels engaging said object for maintaining proper spatial relationship between said assembly and said object.

10. The apparatus of claim 9, wherein said panel comprises a slot having felt wicks saturated with cleaning solvent placed therein, said slot receiving said arm and cleansing said scalpel to remove accumulated debris for subsequent use.

11. The apparatus of claim 9, wherein said pair of spools comprises:

a strip material spool having a roll of strip material for dispensing;

a backing material spool collecting backing material separated from said strip material during application onto said object.

12. The apparatus of claim 11, wherein said strip material spool comprises a photo-detector that automatically terminates application of said strip material upon failure to detect said strip material on said strip material spool.

13. The apparatus of claim 11, wherein said backing material spool is driven by an air motor positioned behind said backing material spool, said air motor allowing for adjustment to pulling tension and speed of collecting said backing material.

14. The apparatus of claim 11, wherein each of said pair of spools comprise a laterally adjustable flange to accommodate said strip material of varying widths.

15. The apparatus of claim 9, wherein said pair of vacuum blocks comprise;

an upper vacuum block;

a lower vacuum block, wherein a margin separates said upper vacuum block from said lower vacuum block;

each of said pair of vacuum blocks having a plurality of apertures in communication with a vacuum generating air cylinder to accurately position said strip material onto said object.

16. The apparatus of claim 15 further comprising a pivotal retention brace affixed to said lower vacuum block for placing tension on said strip material as said scalpel severs said strip material.

17. The apparatus of claim 9, wherein said arm rotates by expansion and contraction of an air cylinder communicating with said arm.

18. The apparatus of claim 1 further comprising a plurality of strip material applicator assemblies.

19. The apparatus of claim 18, wherein said plurality of strip material applicator assemblies comprise a pair of strip material applicator assemblies positioned to one side of a central axis of said base.

20. The apparatus of claim 18, wherein said plurality of strip material applicator assemblies comprise a pair of strip material applicator assemblies positioned to one side of a central axis of said base, and further comprises a second pair of strip material applicator assemblies positioned to an opposite side of said central axis of said base.

21. The apparatus of claim 1 further comprising a direct plasma flame treatment member selectively movable adjacent said object, said flame member generating a flame for evaporating residue from an exterior of said object.

22. The apparatus of claim 1, further comprising a selectively movable brush head for engaging said strip material applied to said object, said brush head removing air pockets and surface debris therefrom.

23. The apparatus of claim 1, wherein said object is a member selected from the group consisting of a circular exterior circumferential surface and a polygonal exterior perimeter surface.

24. The apparatus of claim 1, wherein said strip material is a member selected from the group consisting of reflective tape, packaging tape, deformable metal material, deformable plastic material and deformable rubber material.

25. The apparatus of claim 1 further comprising a pair of visual detectors at a front of said apparatus, wherein unauthorized penetration of an item breaks a beam between said detectors and automatically terminates application cycle.

26. A method of applying strip material to an object utilizing the apparatus of claim 1, comprising the steps of:

beginning an initial sequence, said initial comprising seating of an object onto a mandrel, actuating engagement of the plurality of clamps onto said object and actuating rotation of said mandrel;

progressing to an intermediate sequence, said intermediate sequence comprising urging of at least one strip material applicator assembly forward to engage and apply strip material to said object and then severing said strip material after said object completes one revolution about said base;

finishing with a terminal sequence, said terminal sequence comprising terminating rotation of said mandrel and seated said object, releasing engagement of said plurality of clamps from said object, and removing said object from said mandrel.

27. The method of claim 26, wherein said initial sequence further comprises the steps of moving a direct flame plasma treatment member adjacent to said object, flame treating an exterior surface of said object to evaporate liquid residue, and moving said direct flame plasma treatment member away from said object.

28. The method of claim 27, wherein said intermediate sequence further comprises the steps of moving a brush head to engage said strip material as applied to said object, dispersing of air pockets and aiding adhesion between said strip material and said object by engagement of said brush head with said object, and moving said brush head away from said object.

* * * * *